United States Patent [19]

Butler

[11] Patent Number: 4,505,633

[45] Date of Patent: Mar. 19, 1985

[54] OVERRUNING SPROCKET FOR BALE WAGON PICKUP

[75] Inventor: L. Dennis Butler, Kingsburg, Calif.

[73] Assignee: Sperry Corporation, New Holland, Pa.

[21] Appl. No.: 413,111

[22] Filed: Aug. 30, 1982

[51] Int. Cl.³ .............................................. A01D 90/02
[52] U.S. Cl. .................... 414/528; 198/834; 198/854; 414/39; 464/157; 474/903
[58] Field of Search .......................... 414/39, 40, 528; 198/834, 854; 74/411, 405; 464/157; 474/903

[56] References Cited

U.S. PATENT DOCUMENTS

| | | | |
|---|---|---|---|
| 2,301,543 | 11/1942 | Hlavaty | 198/854 X |
| 2,848,127 | 8/1958 | Grey | 414/39 |
| 4,259,900 | 4/1981 | Campbell et al. | 198/834 X |

Primary Examiner—Robert J. Spar
Assistant Examiner—Janice Krizek
Attorney, Agent, or Firm—Larry W. Miller; Darrell F. Marquette; Frank A. Seemar

[57] ABSTRACT

An overrunning sprocket for the bale pickup mechanism on a bale wagon is disclosed wherein the drive sprocket for transferring rotational power from a drive shaft to the elevating mechanism in the bale pickup is rotatably mounted on the drive shaft for rotation independently thereof. A drive lug welded to the drive sprocket is engageable with a second drive lug welded to the drive shaft to limit the rotation of the drive sprocket relative to the drive shaft and permit rotational power to be transferred from the drive shaft to the elevator. The drive sprocket is free to overrun the drive shaft by substantially one revolution to permit the elevator to be accelerated by the picking up of a bale from the ground when the ground speed of the bale wagon is greater than the speed of the elevator in the bale pickup mechanism.

2 Claims, 8 Drawing Figures

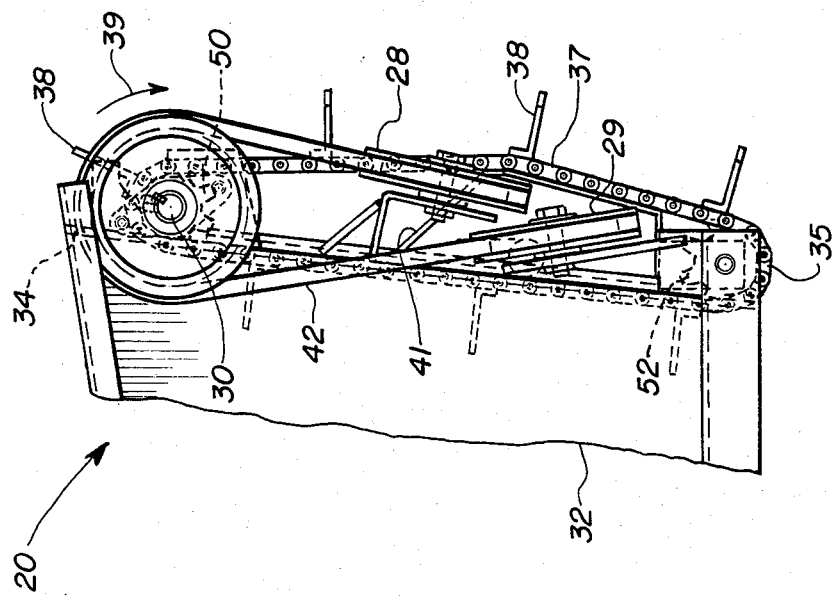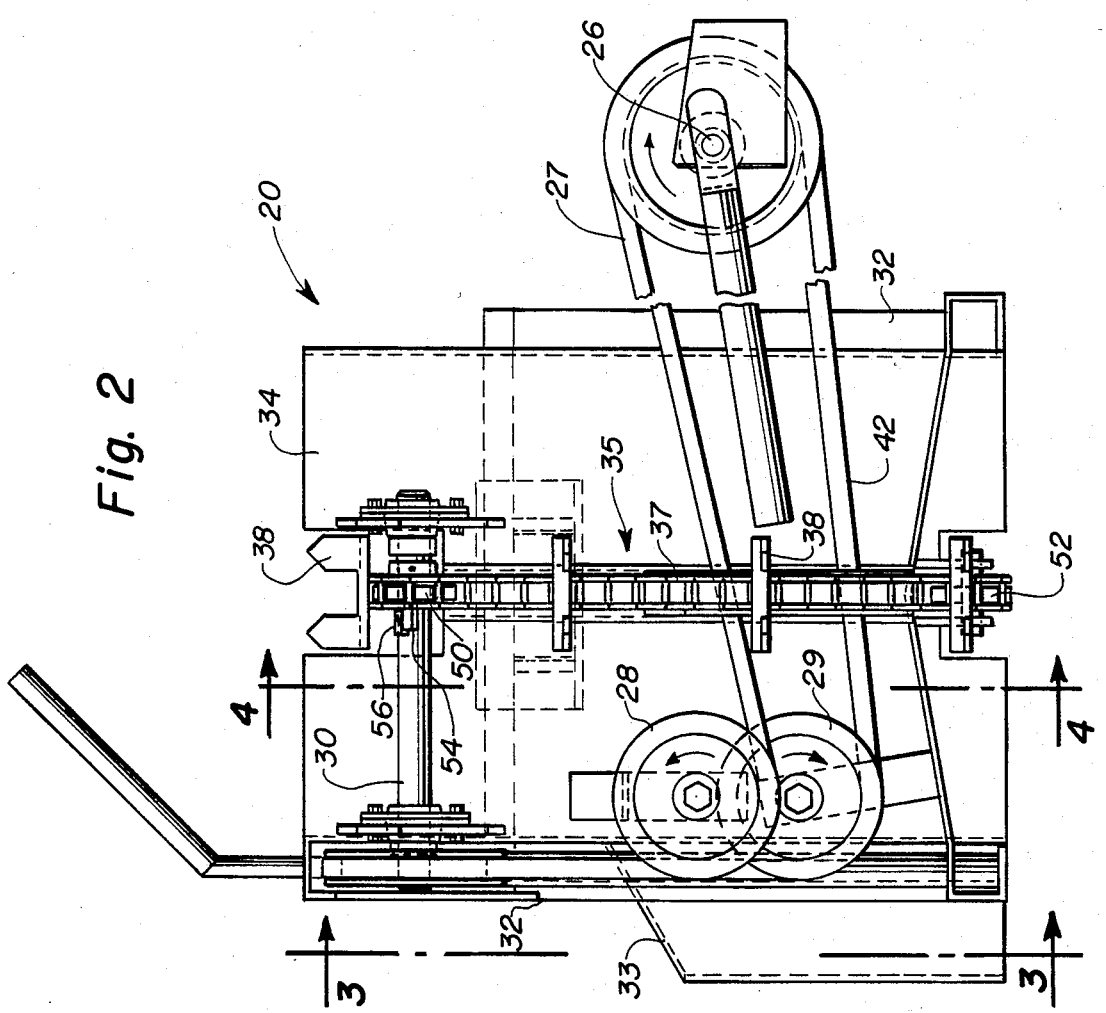

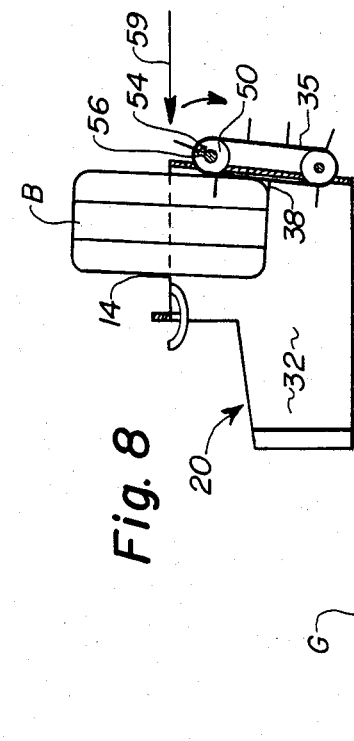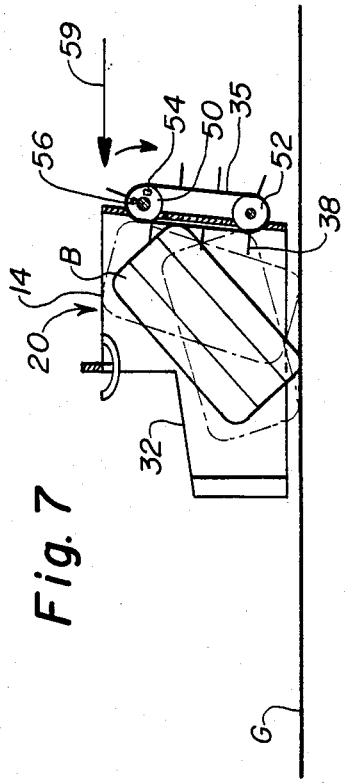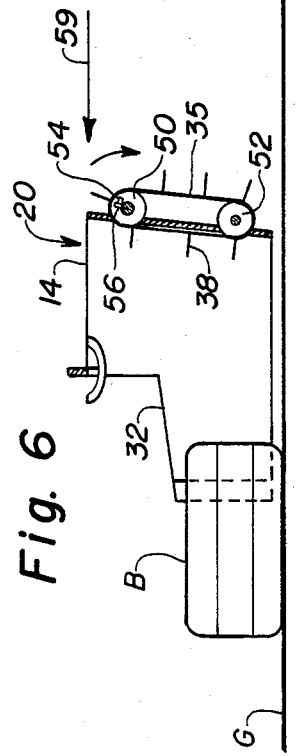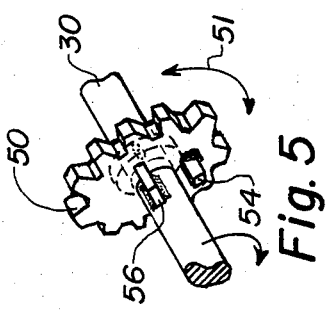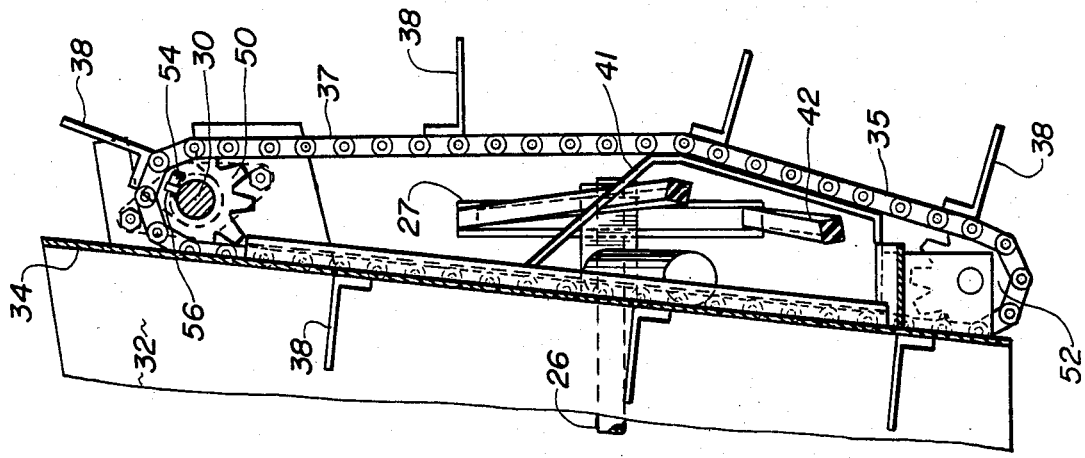

OVERRUNING SPROCKET FOR BALE WAGON PICKUP

BACKGROUND OF THE INVENTION

The present invention relates generally to bale wagons and, more particularly, to a pickup mechanism for engaging bales lying on the ground and elevating them onto a bale receiving table mounted on the bale wagon.

Generally, bale wagons are provided with a pickup mechanism, sometimes referred to as a loader, for engaging bales lying on the ground and elevating them onto the bale wagon to form a stack. Typically, the pickup will include an elevator, usually in the form of a chain conveyor having bale engaging members mounted thereon, to convey bales from the ground onto the bale wagon. The elevator is normally driven by a drive mechanism having a drive shaft delivering rotational power from a prime mover and a power transfer member mounted on the shaft to transfer rotational power from the shaft to the elevator.

When the bale wagon is moving along the ground faster than the driven speed of the elevator, any bale being picked up from the ground cannot be elevated at a sufficient rate to prevent the bale from being broken. A known solution for this problem is to provide an overrunning clutch between the elevator and the drive shaft to permit the movement of the bale into the pickup mechanism to accelerate the elevator, thereby elevating the bale from the group at a rate corresponding to the ground speed of the bale wagon. Once the bale has been elevated off the ground, the elevator can decelerate to the speed at which it is driven by the drive shaft. However, overrunning clutches are expensive, and it is desirable to provide a less expensive device to permit the elevator to overrun the drive shaft and, thereby, maintain integrity of the shape of the packaged bale.

SUMMARY OF THE INVENTION

It is an object of this invention to overcome the aforementioned disadvantages of the prior art by providing an overrunning sprocket for the drive to a pickup mechanism on a bale wagon.

It is another object of this invention to permit the pickup elevator to overrun the drive shaft without providing an overruning clutch.

It is an advantage of this invention that bale shape integrity is maintained when the speed of the bale wagon exceeds the speed of the elevator in conveying bales.

It is a feature of this invention that the sprocket is free to rotate independently of the drive shaft on which it is mounted.

It is another feature of this invention that engageable drive lugs welded, respectively, to the drive sprocket and the drive shaft limit the rotation of the drive sprocket relative to the drive shaft to permit power to be transferred from the drive shaft through the sprocket, yet permit the sprocket to overrun the drive shaft.

It is yet another feature of this invention that the overrunning sprocket permits approximately one revolution of overrun relative to the drive shaft.

It is another advantage of this invention that the overrunning sprocket can be an inexpensive substitute for an overrunning clutch.

It is an object of this invention to provide an overrunning sprocket for the drive to a pickup elevator on a bale wagon which is durable of construction, inexpensive of manufacture, carefree of maintenance, facile in assemblage and simple and effective in use.

These and other objects, features and advantages are accomplished according to the instant invention by providing an overrunning sprocket for the bale pickup mechanism on a bale wagon wherein the drive sprocket for transferring rotational power from a drive shaft to the elevating mechanism in the bale pickup is rotatably mounted on the drive shaft for rotation independently thereof. A drive lug welded to the drive sprocket is engageable with a second drive lug welded to the drive shaft to limit the rotation of the drive sprocket relative to the drive shaft and permit rotational power to be transferred from the drive shaft to the elevator. The drive sprocket is free to overrun the drive shaft by substantially one revolution to permit the elevator to be accelerated by the picking up of a bale from the ground when the ground speed of the bale wagon is greater than the speed of the elevator in the bale pickup mechanism.

BRIEF DESCRIPTION OF THE DRAWINGS

The advantage of this invention will become apparent upon consideration of the following detailed disclosure of the invention, especially when taken in conjunction with the accompanying drawings wherein:

FIG. 2 is a rear elevational view of the pickup mechanism taken along lines 2—2 of FIG. 1, portions of the drive mechanism to the pickup elevator being broken away;

FIG. 3 is a side elevational view of the elevator and the drive mechanism therefor taken along lines 3—3 of FIG. 2 at the rearward end of the pickup mechanism;

FIG. 4 is a partial cross-sectional view of the pickup mechanism taken along lines 4—4 of FIG. 2 to show the relationship of the overrunning sprocket to the elevator;

FIG. 5 is a perspective detail view of the overrunning sprocket mounted on the drive shaft; and FIGS. 6, 7 and 8 are sequential diagrammatic cross-sectional views through the pickup mechanism showing the operation of the overrunning sprocket.

DETAILED DESCRIPTION OF THE PREFERRED EMBODIMENT

Figure 1:
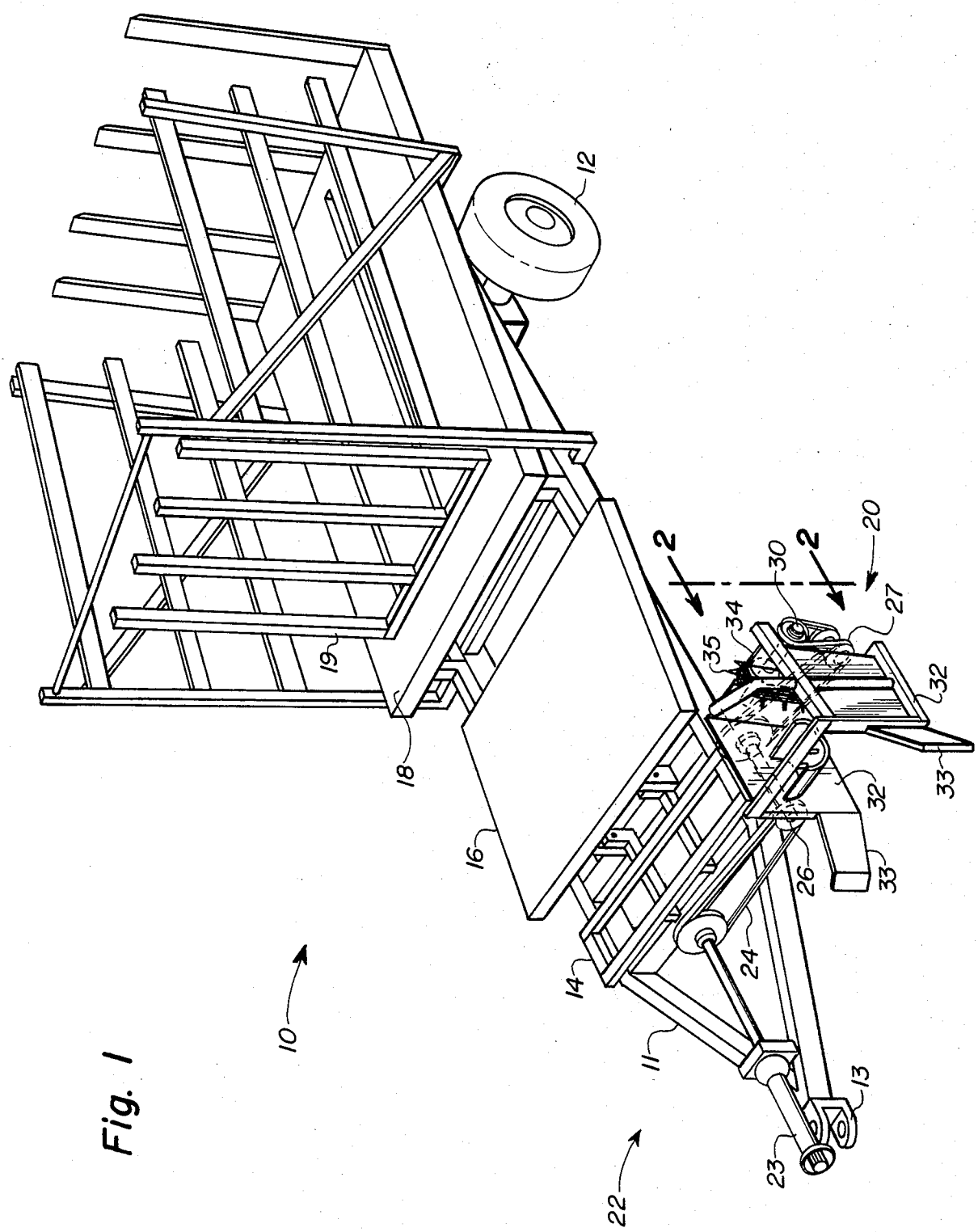
FIG. 1 is a perspective view of a bale wagon incorporating the principles of the instant invention.

Referring now to the drawings, particularly to FIG. 1, a perspective view of a bale wagon incorporating the principles of the instant invention can be seen. The bale wagon 10 includes a frame 11 having wheels 12 mounted thereon to permit mobile movement of the bale wagon 10 over the ground and a hitch 13 for connection to a prime mover (not shown).

A first bale receiving table 14 is pivotally mounted on the frame forwardly of a second tier-forming table 16 also pivotally mounted on the frame 11. A third table 18, commonly referred to as a load rack, is mounted on the frame 11 rearwardly of the second table 16 to receive tiers of bales from the second table 16 and form a stack of bales. A rolling rack 19 is movably mounted on the third table 18 to support the stack of bales being formed thereon. A pickup mechanism 20 is supported by the frame 11 adjacent the first table 14 to engage bales lying on the ground and elevate them onto the first table 14.

The general operation of a bale wagon 10 is well known in the art. The pickup mechanism 20 engages bales lying on the ground and deposits them on the first table 14 in a row. Each row of bales positioned on the first table 14 is transferred to the second table 16 via the pivotal movement of the first table 14 relative to the frame 11 until a tier of bales is formed on the second table 16. The second table 16 is pivotally movable to deposit a completed tier of bales on the third table 18, moving the rolling rack 19 rearwardly, until a complete stack of bales is formed. Typically, the third table 18 is also pivotally movable to deposit a completed stack of bales at a selected location. The mechanism for pivotally moving the first, second and third tables has not been shown for purposes of clarity, but typically comprise hydraulic cylinders actuatable to selectively pivot the respective tables 14, 16 and 18.

The drive mechanism 22 for operatively powering the pickup mechanism 20 is representatively shown in FIG. 1. A power take-off shaft 23 is adapted for connection to the prime mover (not shown) to be rotatably driven. A first belt power transmission assembly 24 transfers rotational power from the power take-off shaft 23 to an intermediate longitudinal shaft member 26. As is best seen in FIGS. 2 and 3, a second belt-power transmission assembly, including first and second idler pulleys 28,29 and a drive belt 42, transfer rotational power from the intermediate shaft member 26 to a transversely mounted pickup drive shaft 30.

Referring now to FIGS. 1–4, it can be seen that the pickup mechanism 20 includes a pair of spaced apart sidewalls 32 having forwardly diverging guide rails 33 mounted thereon to guide a bale on the ground between the sidewalls 32. An elevator 35 is rotatably mounted along a rearward wall 34 interconnecting the spaced apart sidewalls 32 to elevate bales from the ground. The elevator 35 is shown in the form of a chain 37 onto which are mounted a plurality of bale engaging members 38 rotatable in the direction indicated by the arrow 39 in FIG. 3 so that the bale engaging members 38 engage bales lying on the ground and positioned between the spaced apart sidewalls 32 to elevate them upwardly onto the bale receiving table 14. A guide member 41 keeps the opposing runs of the endless chain 37 spaced sufficiently to permit the passage of the endless belt 42 of the second power transmission assembly 27 for engagement with the idler pulleys 28,29.

As is best seen in FIGS. 2–5, the endless chain 37 is entrained around the drive sprocket 50 and the idler sprocket 52. The drive sprocket 50 is rotatably mounted on the pickup drive shaft 30 for rotation independently of the shaft 30 as indicated by the directional arrow 51 in FIG. 5. A first drive lug 54 is welded to the drive sprocket 50 proximate to the pickup drive shaft 30. A second drive lug 56 is welded to the drive shaft 30 adjacent the drive sprocket 50 to be engageable with the first drive lug 54. Rotation of the drive shaft 30 causes the second drive lug 56 to engage the first drive lug 54 and drivingly rotate the drive sprocket 50 to power the elevator 35.

Because the drive sprocket 50 is mounted for rotation independently of the drive shaft 30, any acceleration of the elevator 35 faster than the driven speed induced by the rotating drive shaft 30 can be accommodated by a rotation of the sprocket 50 on the drive shaft 30 for substantially one revolution until the first drive lug 54 reengages the second drive lug 56 from behind. This single revolution of overrun permits the elevator 35 to be accelerated when engaging a bale lying on the ground while the bale wagon 10 is moving at a rate of speed faster than the driven speed of the elevator 35.

The operation of the overrunning sprocket is diagrammatically shown in FIGS. 6–8. Before a bale B is engaged by the elevator 35, the drive lug 56 affixed to the drive shaft 30 is drivingly engaged with the first drive lug 54 affixed to the drive sprocket 50, operatively powering the elevator 35 at a driven speed. The movement of the bale wagon 10 in a direction indicated by the arrow 59 causes the bale B lying on the ground G to pass between the sidewalls 32 and be engaged by the elevator 35.

When the bale wagon 10 is moving faster than the speed of the elevator 35, the engagement of the bale B with the elevator 35 accelerates the elevator 35 at a speed greater than the aforementioned driven speed. The overrunning sprocket 50 allows the chain 37 to be accelerated by the bale B by overrunning the drive shaft 30, i.e., rotating relative to the drive shaft 30, resulting in the first drive lug 54 becoming disengaged from the second drive lug 56. After the bale B has been elevated from the ground G and is supported by the bale engaging members 38, the speed of the elevator 35 decelerates, allowing the second drive lug 56 to catch up with the first drive lug 54 so that the elevator 35 continues to be operatively powered at the driven speed to elevate the bale B onto the bale receiving table 14.

The provision of the overrunning drive sprocket 50 to allow the chain 37 to be accelerated by engaging bales B permits the bales to up-end faster, thereby reducing the scuffing of the bottom of the bale in contact with the ground G and, consequently, reducing the pressure on the corner of the bale in contact with the ground. In turn, the reduction in pressure reduces the chance that the wire or twine holding the bale B together might be pulled off during the elevation of the bale B onto the bale receiving table 14. Accordingly, the overrunning sprocket 50 provides an inexpensive mechanism for maintaining the integrity of the shape of the bales B engaged by the pickup mechanism 20.

It will be understood that various changes in the details, material, depth and arrangement of parts which have been described and illustrated to explain the nature of the invention, will occur to and may be made by one skilled in the art upon a reading of the disclosure within the principles and scope of the invention. The foregoing description illustrates preferred embodiments of the invention, however, concepts, as based upon such a description, may be employed in other embodiments without departing from the scope of the invention. Accordingly, the following claims are intended to protect the invention broadly as well as in the specific form shown herein.

Having thus described the invention, what is claimed is:

1. In a bale wagon having a frame; a bale receiving table mounted on said frame; a bale pickup means supported by said frame adjacent said bale receiving table for picking up bales from the ground and transferring said bales onto said bale receiving table, said pickup means including a rotatably driven elevator operable to engage said bales and elevate them onto said bale receiving table; and drive means for operatively powering said bale pickup means, said drive means including a drive shaft for rotatably driving said elevator, the improvement comprising:

a drive sprocket drivingly engaged with said elevator for transferring rotational power from said drive shaft to said elevator, said drive sprocket being rotatably mounted on said drive shaft for rotation thereon independently of said drive shaft;

a first drive lug rigidly affixed to said drive srocket; and a second drive lug rigidly affixed to said drive shaft adjacent said drive sprocket to be engageable with said first drive lug such that upon rotation of said drive shaft said second drive lug engages said first drive lug to cause rotation of said drive sprocket to transfer rotational power from said drive shaft to said elevator, said first and second drive lugs being disengageable to permit said drive sprocket to rotate relative to said drive shaft during operation thereof by only one revolution less the circumferential thickness of said first and second drive lugs.

2. An overrunning sprocket mounted on a drive shaft of a harvesting machine and engageable with means for transferring rotational power, said drive shaft being operably connected to a power transfer means mounted on said harvesting machine for providing a source of rotational power thereto, said power transfer means operably interconnecting said overrunning sprocket and a driven member to transfer rotational power from said drive shaft to said driven member, comprising:

a first drive lug rigidly affixed to said overrunning sprocket;

a second drive lug rigidly affixed to said drive shaft adjacent said overrunning sprocket to be engageable with said first drive sprocket; and said overrunning sprocket being rotatably mounted on said drive shaft for rotational movement independently of said drive shaft, said first drive lug being engageable with said second drive lug to effect a rotational driving of said overrunning sprocket with said drive shaft, said first and second drive lugs being disengageable to permit said overrunning sprocket to rotate relative to said drive shaft by only one revolution less the circumferential thickness of said first and second drive lugs.

* * * * *